Figure 1:
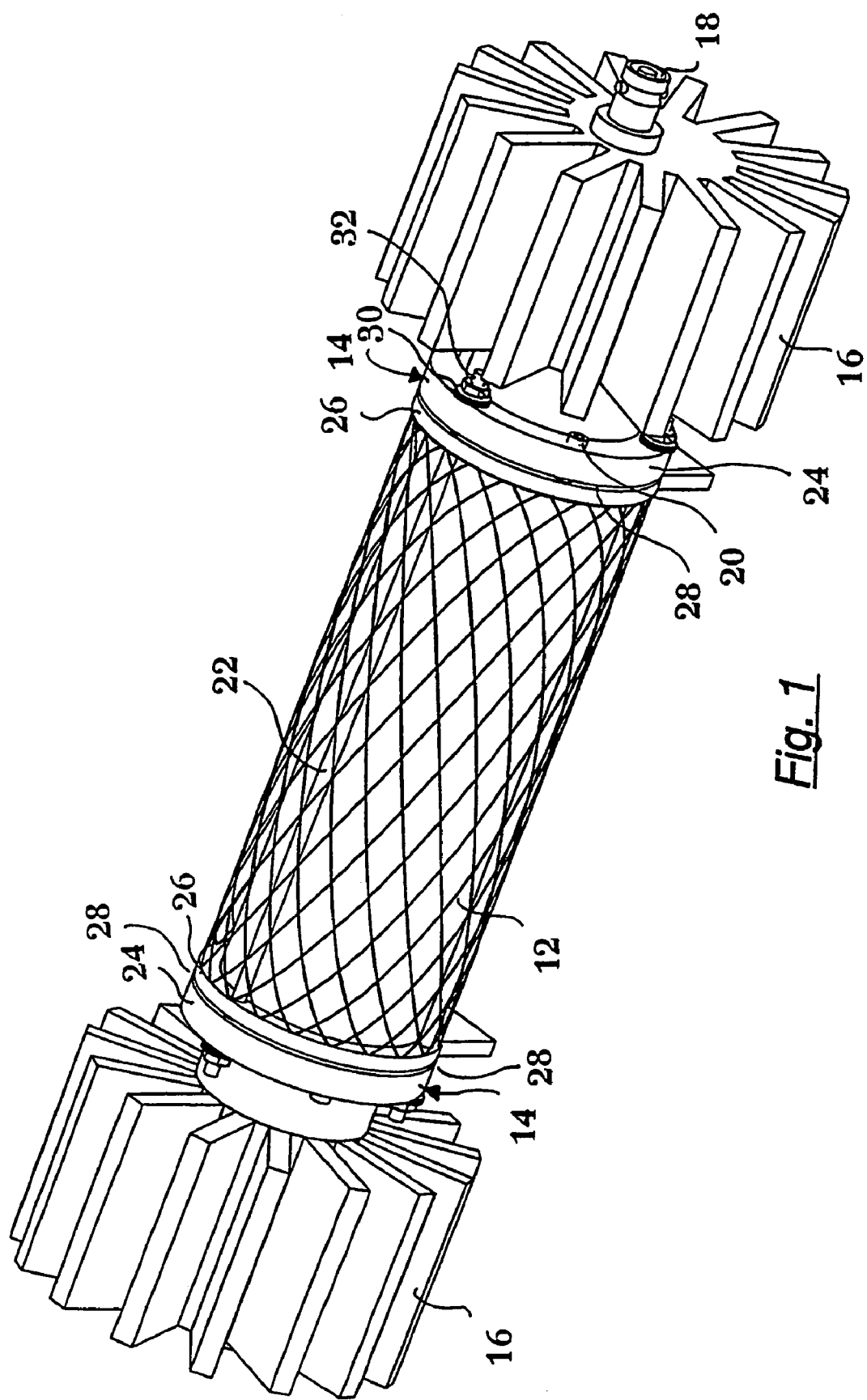

United States Patent
Taufenbach

(10) Patent No.: US 7,274,722 B2
(45) Date of Patent: Sep. 25, 2007

(54) $CO_2$ SLAB LASER

(76) Inventor: Norbert Taufenbach, Bgm.-John-Wey 34, 24340 Eckernförde (DE)

(*) Notice: Subject to any disclaimer, the term of this patent is extended or adjusted under 35 U.S.C. 154(b) by 223 days.

(21) Appl. No.: 11/041,613

(22) Filed: Jan. 24, 2005

(65) Prior Publication Data
US 2005/0180483 A1 Aug. 18, 2005

Related U.S. Application Data

(62) Division of application No. 09/831,698, filed as application No. PCT/DE99/03570 on Nov. 9, 1999, now Pat. No. 6,853,668.

(30) Foreign Application Priority Data

Nov. 13, 1998 (DE) .................... 198 52 284

(51) Int. Cl.
H01S 3/22 (2006.01)
H01S 3/03 (2006.01)
H01S 3/097 (2006.01)

(52) U.S. Cl. .................... 372/61; 372/55; 372/87
(58) Field of Classification Search ................ 372/55, 372/61, 65, 87, 89
See application file for complete search history.

(56) References Cited

U.S. PATENT DOCUMENTS

| | | | |
|---|---|---|---|
| 3,719,900 A | 3/1973 | Hochuli | 372/87 |
| 4,939,738 A | 7/1990 | Opower | 372/95 |
| 5,123,028 A | 6/1992 | Hobart et al. | 372/95 |
| 5,136,606 A * | 8/1992 | Iehisa et al. | 372/61 |
| 5,140,606 A | 8/1992 | Yarborough et al. | |
| 5,353,293 A * | 10/1994 | Shull | 372/34 |
| 5,412,681 A * | 5/1995 | Eisel et al. | 372/64 |
| 5,502,354 A * | 3/1996 | Correa et al. | 315/111.01 |
| 5,502,740 A | 3/1996 | Welsch et al. | 372/82 |
| 5,592,504 A * | 1/1997 | Cameron | 372/61 |
| 5,600,668 A | 2/1997 | Erichsen et al. | 372/87 |
| 5,648,980 A * | 7/1997 | Seguin | 372/92 |
| 5,689,523 A * | 11/1997 | Seguin | 372/82 |
| 5,751,750 A | 5/1998 | Friede et al. | 372/34 |
| 5,754,575 A | 5/1998 | Sukhman et al. | 372/36 |
| 5,822,354 A | 10/1998 | Vitruk | 372/92 |
| 5,867,517 A | 2/1999 | Sukhman et al. | 372/58 |

(Continued)

FOREIGN PATENT DOCUMENTS

EP 0 275 023 7/1988

(Continued)

OTHER PUBLICATIONS

J. Appl. Phys. 59(2), "Performance Characteristics of Sealed-Off $CO_2$ Laser With $La_{1-x}Sr_x$ $CoO_3$ Oxide Cathode", N. Iehisa, K. Fukaya, K. Matsuo, N. Horiuchi, and N. Karube, Jan. 15, 1986, pp. 317-323.

Primary Examiner—Minsun Oh Harvey
(74) Attorney, Agent, or Firm—Harness, Dickey & Pierce

(57) ABSTRACT $CO_2$ slab laser having a gas-filled tubular housing, sealed off at both ends by end pieces, which accommodates two overlapping electrodes extending into the tubular housing and mirrors arranged in the region of the electrodes, where each of the two end pieces holds an electrode, the mirrors are arranged stationary relative to the electrodes and the electrodes, jointly with the mirrors, are adjustable relative to one another.

25 Claims, 6 Drawing Sheets

U.S. PATENT DOCUMENTS

| | | | |
|---|---|---|---|
| 5,881,087 A | 3/1999 | Sukhman et al. | 372/61 |
| 5,901,167 A | 5/1999 | Sukhman et al. | 372/58 |
| 5,953,360 A | 9/1999 | Vitruk et al. | 372/87 |
| 6,529,538 B1 * | 3/2003 | Nakano et al. | 372/87 |
| 6,654,402 B1 * | 11/2003 | Kakizaki et al. | 372/86 |
| 6,922,428 B2 * | 7/2005 | Tanaka et al. | 372/55 |

FOREIGN PATENT DOCUMENTS

| | | |
|---|---|---|
| EP | 0 305 893 | 3/1989 |
| EP | 0 477 864 A1 | 4/1992 |
| EP | 0 585 481 A1 | 3/1994 |
| JP | 2002043659 A * | 2/2002 |
| WO | WO94/15384 | 7/1994 |

* cited by examiner

$CO_2$ SLAB LASER

The invention relates to a $CO_2$ slab laser device.

Slab lasers are disclosed in previous applications of, among others, the holder of this patent (e.g., WO 94/15384). Their geometry is characterized in that between two plate-like electrodes, substantially parallel to one another, a narrow discharge chamber is formed for a gas, in particular $CO_2$, which is excited by a high frequency voltage applied to the electrodes. For obtaining a laser effect, resonator mirrors are arranged on the opposite faces of the narrow discharge chamber formed by the electrodes.

As prior art there may be mentioned an article in a US periodical, N. Iehisa et al., "Performance characteristics of sealed-off $CO_2$ laser with $La_{1-x}Sr_xCoO_3$ oxide cathode," Journal of Appl. Phys 59 (1986), pages 317 to 323, in which a streamed gas laser with annular electrodes that [have] no cooling function as well as external mirrors provided outside of Brewster windows has already been described, where in one embodiment a partial reflector also is mounted on the outside on an end piece, so that the mirror, together with the electrodes, can be varied in its relative position.

To be mentioned in addition is U.S. Pat. No. 5,140,606, in which is shown, in a slab waveguide laser, an annular flexible bearing sealing off the laser chamber for adjusting at least one mirror separately from the electrodes.

Additional prior art is disclosed in European patent applications with publication numbers 0,275,023 A1, 0,305,893 B1 and 0,477,864 A1.

Common to all the abovementioned designs is that they have internally-cooled electrodes parallel to one another, which form between their plane surfaces turned toward one another a gas-filled chamber containing a gas to be pumped. Each of these electrodes has to be provided with a complicated fastening in the resonator chamber, especially since thermal deformation results in problems in making adjustment or readjustment, which substantially determines the laser output in an unstable resonator.

At the same time, care must be taken to see that the units to be adjusted are located in a closed chamber, through whose walls is passed as little as possible transmission, since these are very hard to seal off. In particular, seals of flexible materials cause problems, since they "gas out." But even when such seals are avoided, unavoidable sealing gaps result in critical sealing problems.

The object of the invention now is to procure a very small simple laser, wherein as few parts as possible are designed to result in low-cost manufacture. According to the invention, this is accomplished by a $CO_2$ slab laser having the features of the main, independent claims. The dependent claims present other advantageous embodiments of the invention.

This makes it possible to build a very tight metallic housing. A quartz housing has the same tightness advantages, since it can be soldered with metal.

It is particularly advantageous to obtain a gas-filled chamber having complete gas tightness that is limited by movable end pieces, designed as flexible bellows, for tilting about a small angle, and in which the electrodes lying opposite one another are borne by the respective end pieces are arranged lengthwise to the tubular housing. At the same time, alignment of the mirrors, which are arranged on the electrodes or on the end pieces, in any case stationary relative to the electrodes and end pieces, may be effected by adjusting screws mounted on the end pieces outside the gas-filled chamber by way of the existing fixed connection of the electrodes with the end pieces (or by the one-piece design in one of the two elements, end piece or electrode). Leads through the wall of the gas-filled chamber need not be provided.

Adjusting elements, which are formed between two sections of the respective end piece, which due to having at least one groove—more advantageously two grooves arranged staggered, one from the inside and one from the outside—serve to position the sections of the end piece at an angle to one another in such a way that the outer (movable) section to which the respective electrode is fastened is adjustable in its angular position, since the thin wall thickness left between the grooves permits a small angular variation by elastic and/or plastic deformation of the material. The wall acts as a flexible bearing, similar to a bellows or an elastic membrane with small tilting motions of the outer annular surface relative to the inner annular surface.

It is proposed that the movable sections of the end pieces may be connected to one another by spring preloaded tension rods that are in connection with the respective other movable end piece, in order so to exert a constant restoring force on the movable end sections.

The gas-filled chamber is formed by a tubular housing, which assumes a variety of tasks. First of all, it is designed to serve to receive the laser gas mixture, but at the same time also to keep the sections to which the electrodes and hence, also the mirrors, are fastened at a constant distance apart. In addition, it isolates the two electrodes electrically from one another. Therefore, nonconducting materials, which advantageously should have little heat expansion, high gas tightness and high rigidity, are particularly suitable as material for the tubular housing. Quartz glass and aluminum oxide ceramic are proposed.

Shielding for the resultant electrical radiation is provided on the outside of the nonconducting tubular housing. Advantageously, this at the same time serves as inductance for the electrodes. Such shielding may be designed as wire mesh, metal bellows or metal foil. Separate shielding is not necessary in a metal housing, nor when only the surface is metallized. Then, to obtain suitable inductance of the tubular housing, in order to stabilize the discharge excited in the inside under HF conditions, the internal geometry, in particular the volume of the envelope, may be adapted to the inductance.

Since the mirrors of a laser according to the invention have no internal cooling and possess no special possibility of adjustment to the electrode, since mirror and electrode form a unit (either made in one piece or bolted firmly together), the heat that is produced in the mirrors is passed on to the electrode. Now, for these electrodes to have as little thermal deformation as possible, they are designed with a semicircular cross section and are cooled internally by cooling bores. These cooling bores contain a cooling medium delivered by a cooling medium pump or advantageously a medium or vapor, which by free convection flow and/or by capillary action, as well as by phase transitions on the walls of the hollow chambers or capillaries, carry heat or latent heat away from the inner walls of the cooling bore.

Advantageously, at the end pieces of the tubular housing, outside the gas chamber, there are provided air coolers, to whose cooling ribs run the cooling lines formed by the cooling bores of the electrodes. For the purpose of better heat emission, flow against these cooling ribs may be provided from the outside by blowers. Efforts are made to use natural circulation according to the "heat pipe" principle. Heat pipes are hermetically sealed and evacuated hollow cylinders whose interior may contain any desired medium, e.g., water, which, at a conventional selected negative pressure, boils at low temperatures.

For example, under these negative pressure conditions water takes up only a small part of the free space, the rest being occupied by water vapor. There the water and water vapor serve for transfer of heat from a heated region of the tube to a cooled one (colder region), in other words, absorption or emission of heat by the water takes place not so much on the basis of heat capacity, but predominantly by latent heat in phase transition. Thus, quantities of heat are transported at very small temperature differences. The principle of the heat pipe was discovered back in 1942 and is used mostly in space technology.

According to the invention, in this way bulky cooling systems are avoided and a smaller and simpler laser is made possible, in which (provided with air coolers at both ends) only HF energy need be supplied from a HF line in order to obtain laser light. No additional cooling agent lines or power supplies are necessary.

The ensured gas tightness results in maximum gas service life, since no impurities penetrate from outside. Thus, the availability of the laser is limited over time only by the decomposition of gas, as well as by gas contamination due to the sputter effect in the gas discharge.

Figure 2:
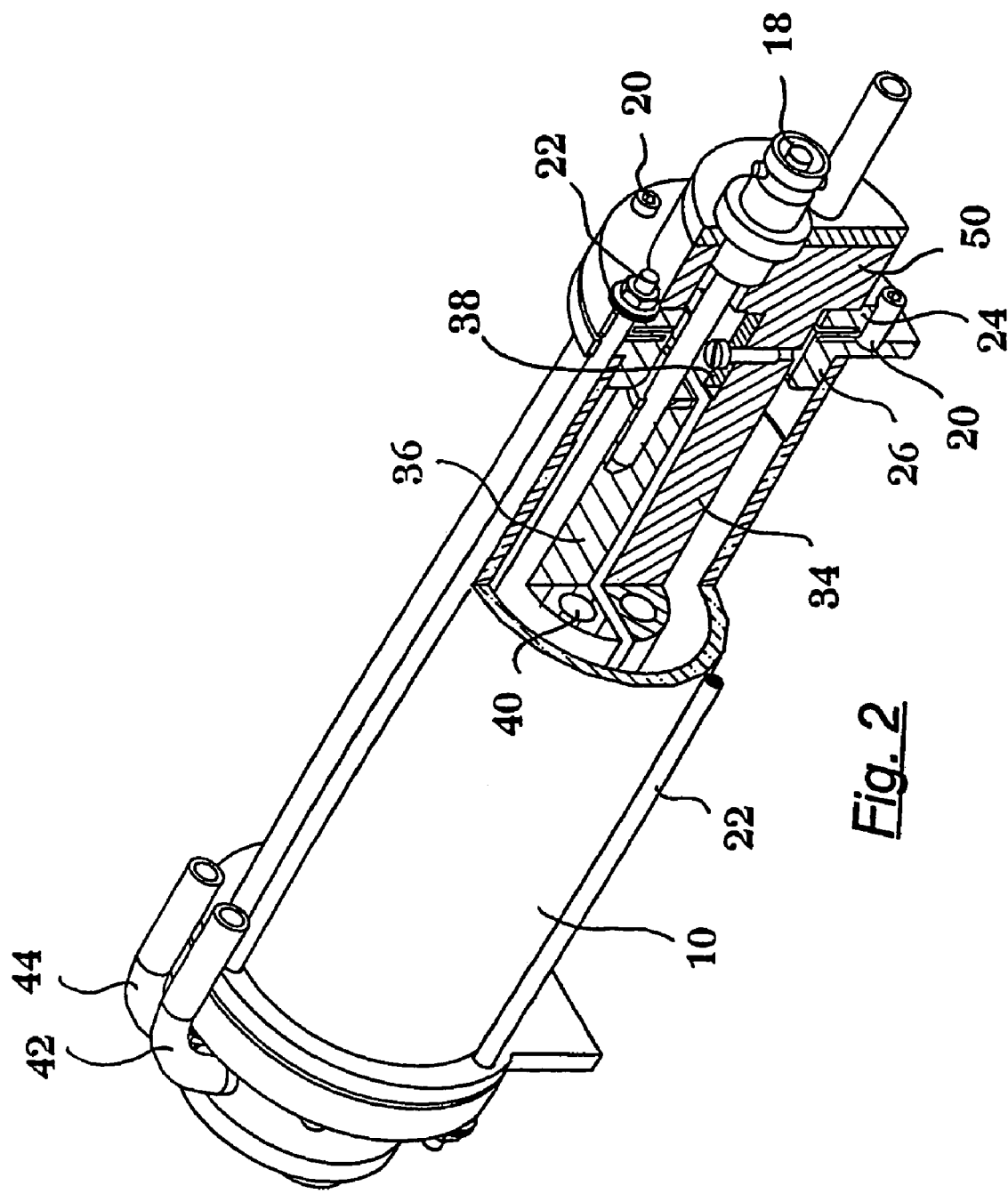
Figure 3:
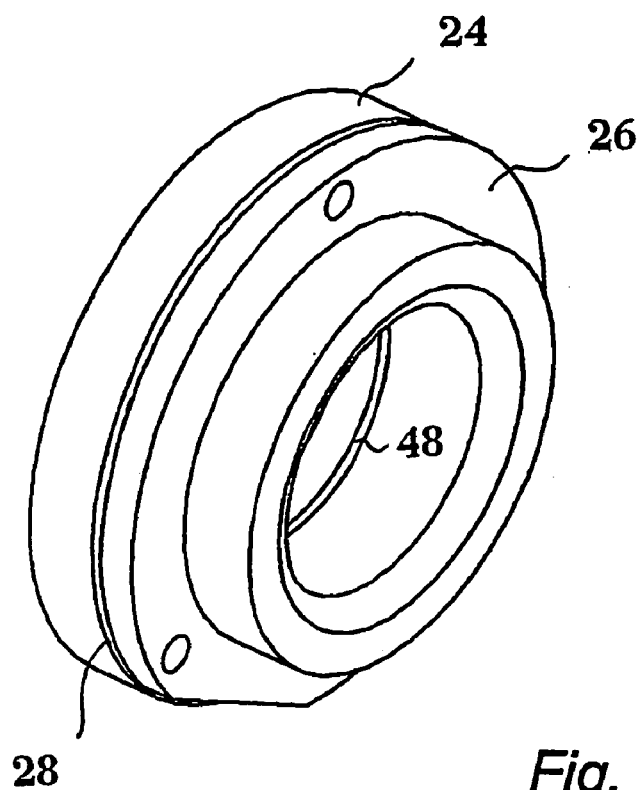
Figure 4:
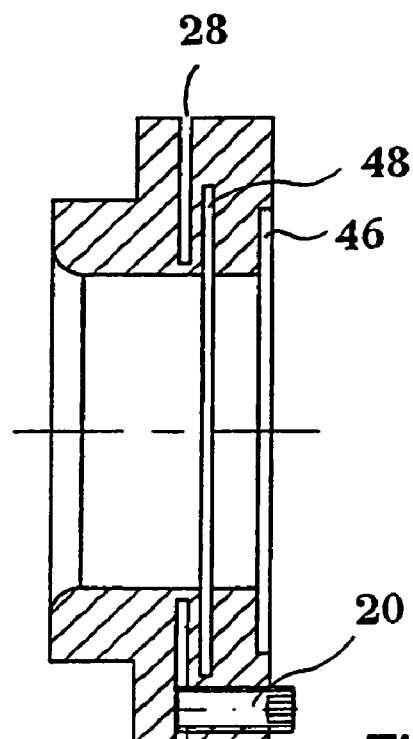
Figure 5:
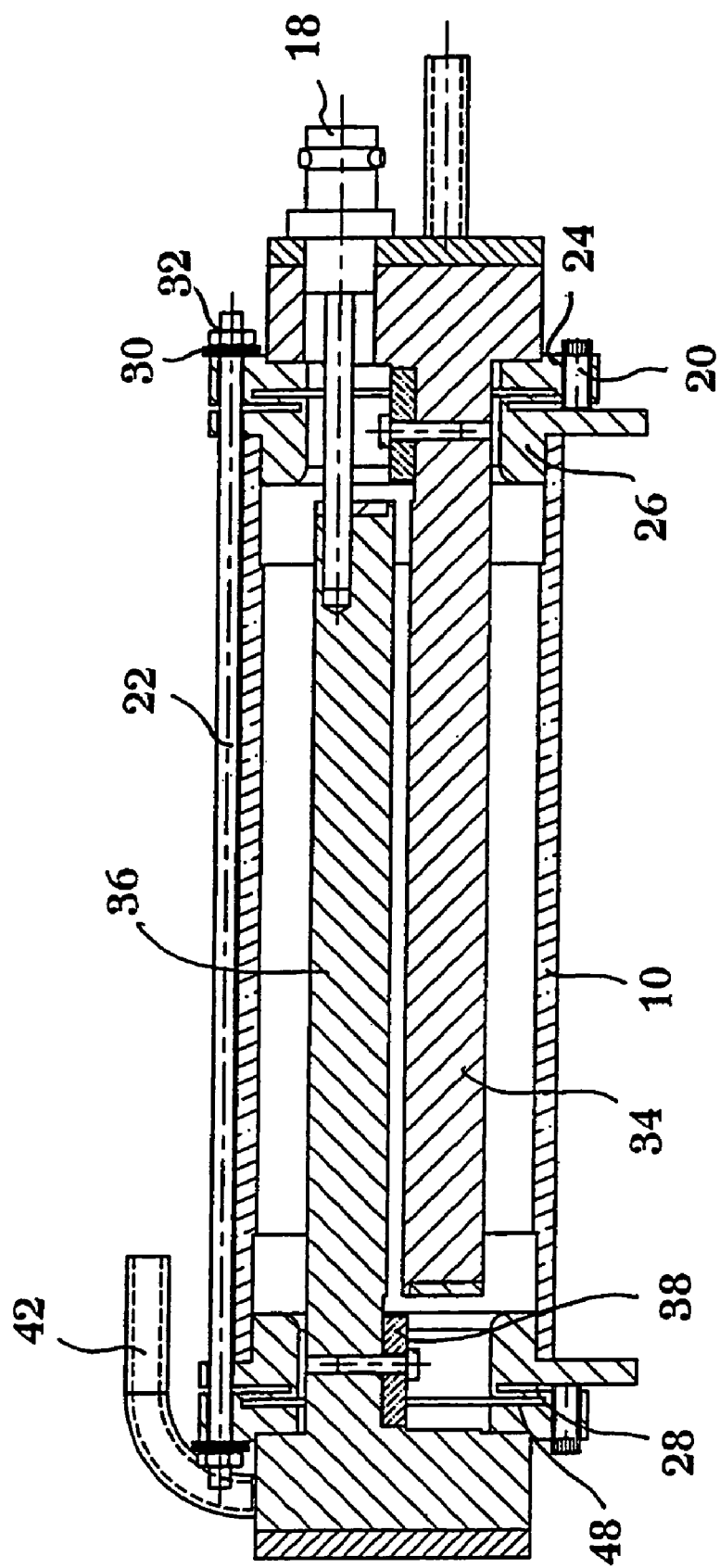
Figure 6:
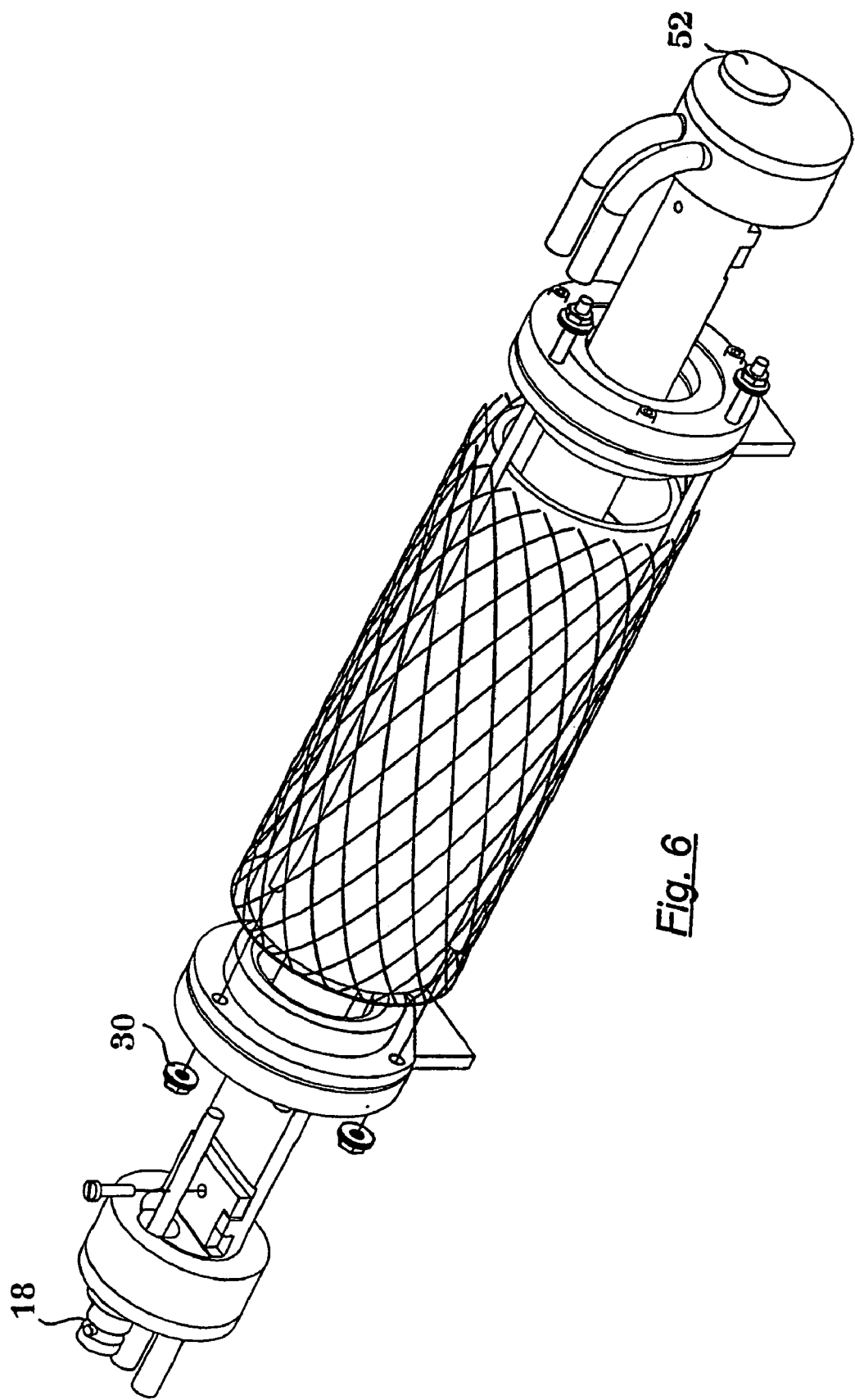
Figure 7:
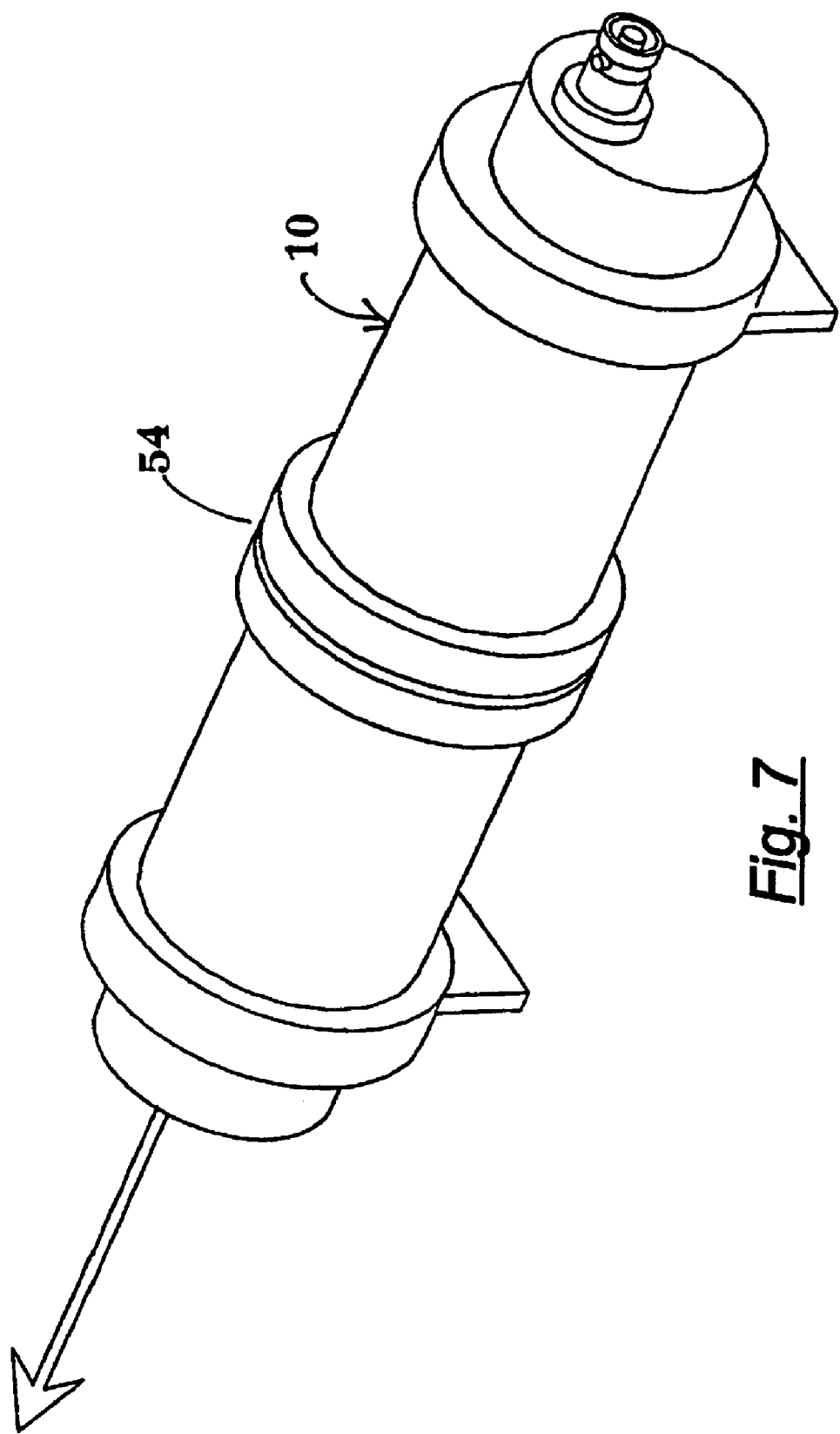

Additional features and advantages of the invention follow from the following description of a preferred example of the invention, wherein FIG. 1 shows the laser according to the invention with cooling means at both ends in a perspective general view;

FIG. 2, the laser according to the invention for external cooling circuit in a partial sectional view, where the two electrodes with cooling medium channels, as well as the structure of the end pieces with flexible bearings, can be seen;

FIG. 3, a flexible bearing end piece in a perspective view;

FIG. 4, the end piece of FIG. 3 in a sectional view;

FIG. 5, the laser structure of FIG. 2 in longitudinal section;

FIG. 6, an exploded view of the laser structure with a shielding netting surrounding the tubular housing and FIG. 7, a laser structure with a tubular housing that in its center is provided with a flexible bellows.

The laser according to the invention, which is represented in FIG. 1, consists of a tubular housing 10, about which is stretched a shielding netting 12, in the event that a nonconducting material is used as shielding material. Metallization of the outer surface is alternatively possible. At the two ends are located end pieces 14, through which the electrodes 34, 36 are passed and on which air coolers 16 advantageously are mounted. A HF line, whose connection 18 can be seen in the right-hand side of the figure, is passed through one end piece with its air cooler. The laser light energy will exit through the other end piece with air cooler.

Adjusting screws 20 are provided on each of the end pieces, and under the shielding netting 12 the movable sections of the end pieces are connected together by tension rods 22. The tension rods 22 act upon the end pieces 14 in such a way that they in each instance pull together the movable sections 24, which are separated by grooves 28 from the fixed sections 26. So that the end pieces 24 still have mobility, spring assemblies 30 are provided under nuts 32 on the backs of the sections 24 pointing away from one another.

This makes it possible, by means of the adjusting screws 20, to adjust the end pieces, which as shown in FIG. 2, each bear one of the two electrodes fastened on the outer (movable) section 24, by means of the adjusting screws 20 in the angular position to the other electrode in each instance (in FIG. 2) to the electrode 36, which is fastened at the left end.

In addition, one of the mirrors, namely the mirror 38, which is fastened to the lower electrode 34 by a bolt, is represented in FIG. 2. It can further be seen that three adjusting screws 20 and three tension rods 22 are proposed in order to obtain optimal adjustability. There the tubular housing 10 is designed cylindrical, while the electrodes 34, 36 in section form a circular segment whose radius is smaller than the inside radius of the tubular housing. The laser gas chamber thus is optimally utilized.

The cooling channels 40 within the electrodes, as well as the semicircular cross section of the electrodes 34, 36, may likewise be seen. The cooling medium bores 40 are connected either to air coolers 16 or to externally connected supplies and returns 42, 44, which lead to conventional external cooling circuits.

So that a crosspiece with a thin wall thickness is obtained, the grooves 28 according to the invention advantageously are supplemented by a groove 48 on the inside, as may be seen in FIGS. 3 and 4. The foot 50 of the electrode, enlarged in diameter, is then fitted into a narrow recess 46 on the outer side of the end pieces.

In FIG. 5, as in FIG. 2, the arrangement is again shown in longitudinal section. Here it can be seen that the mirrors 38, fastened on the electrodes in each instance, are opposite one another in the gas chamber. As already described in detail in the aforementioned printed sources of the prior art, HF energy is applied to the electrodes electrically isolated from one another, so that a gas discharge takes place between the electrodes, while for output the output mirror is designed shorter than the return mirror, so that part of the laser light energy is emitted. There the number of reflections and hence optimal utilization of the reflection is strongly dependent upon the correct adjustment This adjustment can be obtained with the adjusting screws 20 by varying the position of the outer sections 24 of the end pieces 14 relative to the inner sections 26 of the end pieces 14. It is alternatively possible to arrange piezoelectric crystals in the adjusting screws, in order to finely adjust the resonator or, if necessary, readjust it in operation. Such piezoelectric crystals may alternatively be provided in the electrodes themselves, in order to counteract the thermal deformation of the electrodes depending on laser light output.

In the right-hand section of the drawing, it can clearly be seen that these are one-piece end pieces. A soldered or welded general structure is preferable, wherein the two sections 24, 26 of the end pieces 14 (as well as the housing surrounding the gas-filled chamber with the sections 26 and the electrodes 34, 36 in each instance with the section 24) are connected together gas-tight. Cementing together or sealing by sealing rings would not provide such good gas tightness.

At the same time, adjustability of the electrodes with the mirrors may alternatively be provided only at the time of assembly, and later be fixed after adjustment by welding, soldering or cementing of the mounting. In this case, it is not necessary to attach the adjusting elements to the laser or to leave them on it.

Lastly, with reversal of the ends on the right and left, an exploded view of the structure is seen again in FIG. 6, where the beam exit 52, which leaves the laser structure off-center on the end opposite the HF supply 18, can be seen.

FIG. 7 shows the $CO_2$ slab laser in an additional embodiment, in which the tubular housing 10 is designed in two parts, connected in the center by flexible bellows 54, where the two parts are designed adjustable relative to one another.

The invention claimed is:

1. A $CO_2$ slab laser having a gas-filled chamber defined by a tubular housing, with at least two electrodes that extend axially into the tubular housing, said electrodes axially overlapping one another and forming a discharge chamber, and resonator mirrors provided within said housing, characterized in that said electrodes are each supported with fixed connections with end pieces at the opposite ends of said tubular housing, electrical lines connected to at least one of said electrodes for providing high frequency energy to said electrodes to create laser light, said tubular housing having a preselected inductance to provide stabilization of the discharge between said electrodes inside of said housing caused by the high frequency energy, said tubular housing being constructed of a tight housing that is at least partially metallic with said electrodes and related elements being in a compact assembly.

2. A $CO_2$ slab laser according to claim 1, characterized in that each of said electrodes is designed in one piece with one of said end pieces.

3. A $CO_2$ slab laser according to claim 1 with at least one of said end pieces attached to the tubular housing with said adjusting elements by way of a flexible bearing.

4. A $CO_2$ slab laser according to claim 3, characterized in that said flexible bearing is a bellows.

5. A $CO_2$ slab laser having a gas-filled chamber defined by a tubular housing as set forth in claim 1, characterized in that said electrodes are held in said tubular housing by said end pieces sealing off said tubular housing.

6. A $CO_2$ slab laser according to claim 1, characterized in that said mirrors are designed in one piece with said end pieces forming a part of said housing.

7. A $CO_2$ slab laser according to claim 1, characterized in that said tubular housing is designed in two parts, said two parts being interconnected and adjustable relative to one another.

8. A $CO_2$ slab laser according to claim 2 characterized in that the tubular housing is designed in two parts, said two parts being interconnected and adjustable relative to one another by said adjusting elements.

9. A $CO_2$ slab laser according to claim 5, characterized in that said tubular housing is designed in two parts, said two parts being interconnected and adjustable relative to one another.

10. A $CO_2$ slab laser according to claim 6, characterized in that said tubular housing is designed in two parts, said two parts being interconnected and adjustable relative to one another by said adjusting elements.

11. A $CO_2$ slab laser according to claim 1, characterized in that said tubular housing is designed cylindrical and said electrodes in section form a circular segment whose radius is smaller than the inside radius of said tubular housing.

12. A $CO_2$ slab laser according to claim 1, characterized in that each of said mirrors is supported in stationary relationship on one of said electrodes, each of said electrodes with said mirrors thereon are adjustable relative to each other, said electrodes with said mirrors attached are fixed relative to one another after adjustment.

13. A $CO_2$ slab laser according to claim 1 with cooling means for cooling said electrodes, said cooling means including cooling medium bores extending axially through said electrodes.

14. A $CO_2$ slab laser having a gas-filled chamber defined by a tubular housing, with at least two electrodes that extend axially into the tubular housing, said electrodes axially overlapping one another and forming a discharge chamber, and resonator mirrors provided within said housing, characterized in that said electrodes are each supported with fixed connections with end pieces at the opposite ends of said tubular housing, said mirrors are designed in one piece with said electrodes and said electrodes with said mirrors attached are adjustable relative to each other, electrical lines connected to at least one of said electrodes for providing high frequency energy to said electrodes to create laser light, said tubular housing having a preselected inductance to provide stabilization of the discharge between said electrodes inside of said housing caused by the high frequency energy, said tubular housing being constructed of a tight housing that is at least partially metallic with said electrodes and related elements being in a compact assembly.

15. A $CO_2$ slab laser according to claim 14, characterized in that said tubular housing is designed in two parts, said two parts being interconnected and adjustable relative to one another.

16. A $CO_2$ slab laser according to claim 14, characterized in that at least one of said end pieces defining said housing is attached to said tubular housing by way of a flexible bearing.

17. A $CO_2$ slab laser according to claim 14 with cooling means for cooling said electrodes, said cooling means including cooling medium bores extending axially through said electrodes.

18. A $CO_2$ slab laser having a gas-filled chamber defined by a tubular housing, with at least two electrodes that extend axially into the tubular housing, said electrodes axially overlapping one another and forming a discharge chamber, and resonator mirrors provided within said housing, characterized in that each of said electrodes is separately held with fixed connections on a different one of end pieces at the opposite ends of said tubular housing, each of said mirrors is supported in stationary relationship on one of said electrodes and said electrodes with said mirrors thereon are adjustable relative to each other by adjusting elements, electrical lines connected to at least one of said electrodes for providing high frequency energy to said electrodes to create laser light, said tubular housing having a preselected inductance to provide stabilization of the discharge between said electrodes inside of said housing caused by the high frequency energy, said tubular housing being constructed of a tight housing that is at least partially metallic with said electrodes and related elements being in a compact assembly.

19. A $CO_2$ slab laser according to claim 18, characterized in that said adjusting elements contain piezoelectric crystals which are capable of being driven electrically.

20. A $CO_2$ slab laser according to claim 18, characterized in that said mirrors are designed in one piece with said end pieces on said housing.

21. A $CO_2$ slab laser according to claim 18, characterized in that said tubular housing is designed in two parts, said two parts being interconnected and adjustable relative to one another by said adjusting elements.

22. A $CO_2$ slab laser according to claim 20, characterized in said the tubular housing is designed in two parts, said two parts being interconnected and adjustable relative to one another.

23. A $CO_2$ slab laser according to claim 18, characterized in that at least one of said end pieces is attached to said tubular housing with said adjusting elements by way of a flexible bearing.

24. A $CO_2$ slab laser according to claim 18, characterized by adjusting elements that are supported on said tubular housing and act on said electrodes for positional adjustment of said electrodes.

25. A $CO_2$ slab laser according to claim 18 with cooling means for cooling said electrodes, said cooling means including cooling medium bores extending axially through said electrodes.

* * * * *

UNITED STATES PATENT AND TRADEMARK OFFICE
CERTIFICATE OF CORRECTION

PATENT NO.       : 7,274,722 B2                                    Page 1 of 1
APPLICATION NO.  : 11/041613
DATED            : September 25, 2007
INVENTOR(S)      : Taufenbach It is certified that error appears in the above-identified patent and that said Letters Patent is hereby corrected as shown below:

Title Page, replace Item (62) "Related Application Data" with the following data:

Division of application No. 09/831,698 filed January 8, 2002, now Pat. No. 6,853,668, filed as National Stage Application of PCT/DE99/03570 filed on November 9, 1999.

Signed and Sealed this

Eighteenth Day of December, 2007

JON W. DUDAS
*Director of the United States Patent and Trademark Office*